(12) United States Patent
Oberleitner et al.

(10) Patent No.: US 7,210,436 B2
(45) Date of Patent: May 1, 2007

(54) FOUR-CYCLE COMBUSTION ENGINE, PARTICULARLY FOR LAWNMOWERS

(75) Inventors: Nikolaus Oberleitner, Graz (AT); Rudolf Gande, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 11/223,126

(22) Filed: Sep. 12, 2005

(65) Prior Publication Data

US 2006/0054122 A1    Mar. 16, 2006

(30) Foreign Application Priority Data

Sep. 11, 2004    (CN) .................... 2004 1 0099726

(51) Int. Cl.
*F01L 1/02* (2006.01)
(52) U.S. Cl. .................. 123/90.27; 123/90.31
(58) Field of Classification Search ............ 123/41.65, 123/90.27, 90.31, 90.6, 196 W
See application file for complete search history.

(56) References Cited

U.S. PATENT DOCUMENTS 4,441,243 A  *  4/1984  Stojek ...................... 29/433
5,000,126 A     3/1991  Isaka et al.
5,447,127 A  *  9/1995  Luck et al. ............. 123/90.31

FOREIGN PATENT DOCUMENTS

DE    4015610    11/1990
EP    0487960    6/1992

* cited by examiner

*Primary Examiner*—Stephen K. Cronin
*Assistant Examiner*—Hyder Ali
(74) *Attorney, Agent, or Firm*—Dykema Gossett PLLC

(57) ABSTRACT

The invention relates to a four-stroke internal combustion engine (10), especially for lawnmowers, comprising at least one cylinder for a reciprocating piston which acts via a connecting rod on a crankshaft (12) and at least one overhead camshaft (16) for driving overhead gas exchange valves and a transmission (60) between crankshaft (12) and camshaft (16) with a motion plane within a transmission chamber (70) which is perpendicular to the crankshaft axis (14). It is proposed that at least one camshaft bearing (91) for bearing the camshaft (16) is configured as a tunnel bearing, with preferably one bore (93) of a bearing block (92) of at least one camshaft bearing (91) comprising substantially at least one recess (94) corresponding to the shape of the cam. The internal combustion engine (10) is easy to make and comes with reliable lubrication for the engine.

29 Claims, 6 Drawing Sheets

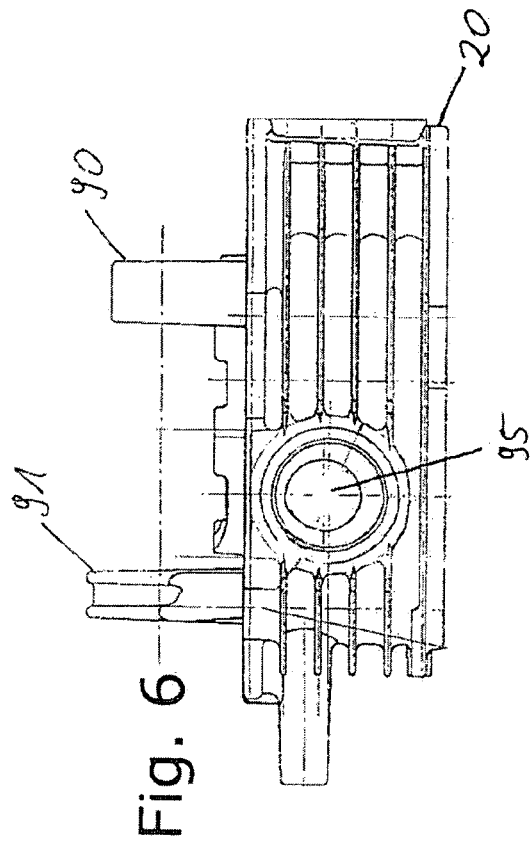
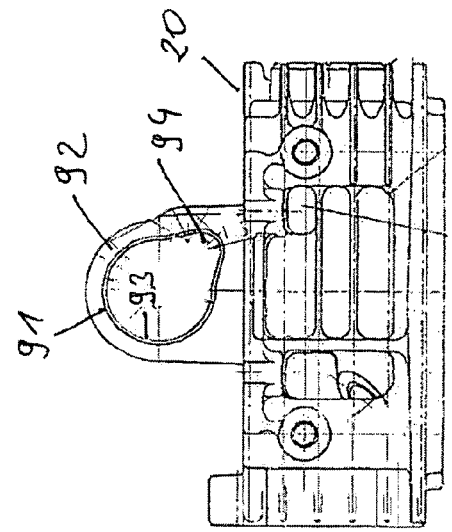
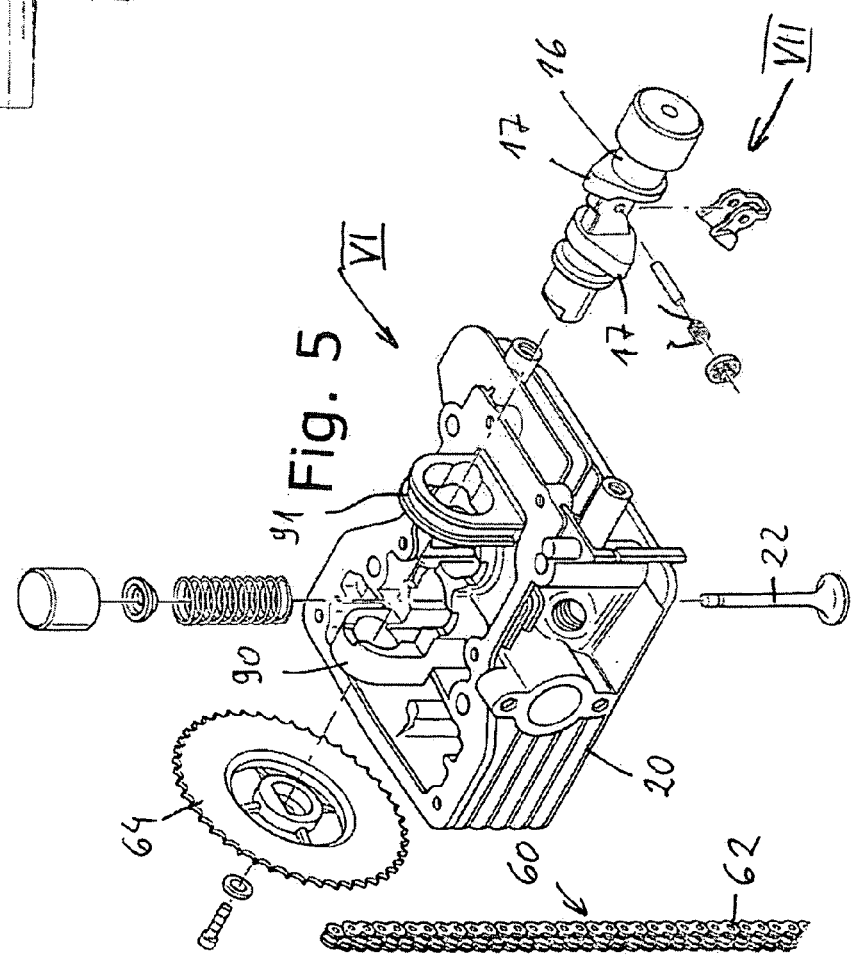

FOUR-CYCLE COMBUSTION ENGINE, PARTICULARLY FOR LAWNMOWERS

BACKGROUND OF THE INVENTION

1. Field of the Invention

The invention relates to a four-stroke internal combustion engine, especially for lawnmowers, comprising at least one cylinder for a reciprocating piston which acts via a connecting rod on a crankshaft and at least one overhead camshaft for driving overhead gas exchange valves and a transmission between crankshaft and camshaft with a motion plane within the transmission chamber which is perpendicular to the crankshaft axis.

2. The Prior Art

For the purpose of precise control of the valve opening times, overhead camshafts are increasingly used even in small driving engines such as lawnmowers for example, which means camshafts which are rotatably held in the cylinder head and are used for the direct or indirect actuation of the overhead intake and exhaust valves. A transmission between camshaft and crankshaft supplies the required driving power and simultaneously ensures the required synchronization of the camshaft rotation wit the crankshaft rotation. The working shaft driven by the engine generally has a vertical orientation in a number of areas of application of internal combustion engines. One example is the lawnmower with rotating blades. The vertical orientation is not kept in all cases however. Depending on the inclination of the base there is a respective inclination of the working shaft. In view of the simplest possible configuration and high efficiency by avoiding frictional losses, a direct coupling of the crankshaft of the driving engine with the working shaft by optional interposing of a simple spur gear is very advantageous. The crankshaft then also assumes a vertical orientation and, depending on the inclination of the base, an orientation more or less inclined towards the vertical.

The at least one "overhead" camshaft extends in such a configuration laterally and axially parallel to the camshaft axis. Continuous lubrication of the camshaft must be ensured in order to ensure reliable operation, especially under high operating temperatures and high speeds.

An internal combustion engine is known from DE 40 15 610 A1 in which an oil pump in the region of the lower bearing point of the crankshaft ensures a force-feed lubrication both of the especially stressed crankshaft con-rod bearing as well as the upper bearing point of the camshaft held in the cylinder head, therefore the overhead camshaft. The oil pump is connected for this purpose to a through port of the crankshaft, which both comprises an outlet towards the con-rod bearing as well as also converges in the region of the upper crankshaft end into cooling conduits of a hollow disk flywheel flanged on the crankshaft. The cooling conduits open into a cooling conduit within the hollow cylinder wall enclosing the piston, which cooling conduit extends parallel to the cylinder axis. Said cooling conduit comprises both passages which open into the crankshaft chamber as well as a passage to the upper camshaft. The oil emerging from this bearing can flow downwardly along the camshaft in order to both lubricate the camshafts as well as transmission between camshaft and crankshaft formed by a belt drive. The lower camshaft bearing can also thus be provided with sufficient lubricating oil. The back-flowing lubricating oil is collected in a separate, obviously lower-lying oil collecting container and is supplied to the oil pump again. The force-feed lubrication of this internal combustion engine requires a high constructional effort. The camshaft shown in DE 40 15 610 A1 is held at its ends, thus having a disadvantageous effect on the flexural strength of the camshaft.

An internal combustion engine with an overhead camshaft and vertically oriented crankshaft is known from EP 0 487 960 A1, in which the transmission formed by a belt drive lies at the upper end of the crankshaft and the camshaft. A force-feed lubrication is provided for the upper crankshaft bearing and the upper camshaft bearing. Oil dripping from the upper camshaft bearing lubricates both the cam surfaces as well as the lower camshaft bearing, from where it flows back to an oil storage annulus enclosing the crankshaft and receiving the oil pump. The transmission per se does not come into contact with the lubricating oil.

An internal combustion engine for a lawnmower is known from U.S. Pat. No. 5,000,126 in which a camshaft is used which is not overhead but is held in the crankshaft chamber.

It is the object of the present invention to provide an internal combustion engine which has a simple configuration, can be assembled with the lowest possible effort and ensures a reliable lubrication of the camshaft held in a deflection-resistant way in the operating states that may occur.

SUMMARY OF THE INVENTION

This is achieved in accordance with the invention in such a way that at least one camshaft bearing for bearing the camshaft is configured as a tunnel bearing, with preferably one bore of a bearing block of at least one camshaft bearing comprising substantially at least one recess corresponding to the shape of the cam. The camshaft bearing can be configured advantageously in an integral manner with the cylinder head. The camshaft can be held with a minimum of deflections and oscillations. The tunnel configuration allows omitting parts and mounting steps. The cylinder head can be provided with an extremely compact configuration. In order to still ensure a sufficient bearing of the camshaft it is provided that the recess is arranged in a minimally stressed region of the bore of the bearing.

It is provided for in an especially advantageous embodiment that a timing gear preferably arranged as a camshaft drive chain gear for driving the camshaft is arranged at an end of the camshaft which is averted from the bearing block with the recess and is fixedly joined with the same, with the timing gear simultaneously securing the axial position of the camshaft. As a result, additional parts for axially securing the camshaft can be omitted.

The simple production of the cylinder head is enabled in such a way that a cylinder head joined to the cylinder crankcase comprises diecastable gas exchange ports and preferably consists of an aluminium alloy, with the cylinder head preferably comprising a plane cylinder head floor. The cylinder head can also be formed integrally with the cylinder crankcase.

The bearing of the crankshaft is advantageously provided through roller bearings, which thus allows keeping the lubrication of the crankshaft exceptionally simple.

It is further provided within the scope of the invention that the transmission chamber is configured as an oil storage chamber, such that the respectively lowest situated section of the transmission is immersed in the oil level in the normal position and optionally in oblique positions of the engine.

The transmission is thus used as a conveying device for the lubricating oil which continually conveys the lubricating oil away from the momentary oil level and thus ensures an even distribution of the oil both in the region of the camshaft as well as in the region of the crankshaft. If the engine is momentarily inclined in such a way for example that the crankshaft chamber lies lower than the camshaft chamber, then the transmission immerses with its end on the crankshaft side into the oil level, which thus leads to the consequence that the transmission entrains oil from there and conveys it to the camshaft region.

On the other hand, oil is conveyed by the transmission into the crankshaft chamber when the camshaft chamber is situated lower.

This oil distribution function of the transmission is also effective for example when the internal combustion engine is stopped or accelerated suddenly, so that as a result of the respective inertia forces the stored oil will accumulate momentarily at the respective end of the oil storage chamber. A lack of oil at the respective other end of the oil storage chamber is thus excluded by the transmission.

Conventional transmissions such as spur gearings are used as transmissions. A transmission which is formed by an endless chain is especially preferably due to simple configuration and high oil conveying capacity, which chain runs via a gearwheel joined to the camshaft and a gearwheel joined to the crankshaft. This chain may concern a roller chain, sleeve-type chain or an inverted-tooth chain.

The transmission can similarly be formed by an endless belt, preferably a toothed belt which runs via a pulley joined to the camshaft and a pulley joined to the crankshaft. The toothed belt is characterized by low weight and quiet running with favourable running precision. The inventive configuration of the transmission chamber as an oil storage chamber promotes quiet running both when using a chain and when using a belt because the oil bath contributes to a substantially increased smoothness of running for the chain or belt.

In order to ensure a reliable lubrication of the respective parts without any further measures it is provided that in the region of the end on the crankshaft side and/or the end on the camshaft side of the transmission at least one deflector surface is provided for oil ejected from the transmission for producing splash oil or an oil mist. The splash oil or oil mist easily also reaches more remote lubricating points.

In order to further improve the lubrication of bearing points it is proposed that in the region of a bearing point of the crankshaft or the camshaft at least one oil groove is provided for conducting precipitated oil mist or splash oil to the respective bearing point.

In many cases, especially in the case of internal combustion engines subjected to lower stress or internal combustion engines where it is relevant to provide an especially cost-effective ability to produce the engine, the lubrication of the crankshaft by the splash oil or the oil mist produced by the transmission is sufficient. In other cases, especially in the case of internal combustion engines for professional use, the use of an oil pump is proposed whose inlet is connected to the oil storage chamber and whose outlet is connected with a crankshaft con-rod bearing. Reliable lubrication of the bearing points subjected to the highest stress is thus ensured.

It is proposed in this connection that the outlet of the oil pump is connected to a through conduit of the crankshaft with an outlet on the con-rod bearing. The through conduit can end at the con-rod bearing because the camshaft is lubricated independent of this by the conveying effect of the transmission.

Many configurations are possible for the oil pump. It is preferably provided however that the oil pump is a rubber sliding vane pump driven by the crankshaft.

In a further development of the invention it is proposed that a part of the oil storage chamber is an annular chamber enclosing the crankshaft. The annular chamber can be produced in a cost-effective way because it is merely necessary to respectively modify a housing part to be attached to the crankcase.

If an oil pump is used it is proposed that the inlet of the oil pump is connected with the annular chamber via a feed conduit which opens into the annular chamber in the region of the floor of the annular chamber. It can be provided in this respect that the feed conduit opens into the annular chamber on the side of the crankshaft axis which is diametrically opposite of the camshaft. This position of the feed conduit ensures that the oil pump is continued to be supplied with oil even in larger inclined positions of the internal combustion engine. The arrangement of the feed conduit on the side of the crankshaft axis averted from the camshaft is provided for such cases where a stronger inclination of the engine is permitted within the terms of a camshaft situated higher, but not a strong inclination in the other direction. The camshaft is usually situated in lawnmowers for example at the front with respect to the driving direction. In the case of a strong sloping it is permitted to move the lawnmower uphill but not downhill. When driving the lawnmower uphill with a strong slope, the stated position of the intake opening of the oil pump ensures a reliable lubrication of the bearings with compressed oil.

In order to prevent any dry running of the oil pump even under extreme inclinations of the engine, it is proposed that the annular chamber is provided with a cover situated beneath the transmission. The cover prevents in a respective inclination of the internal combustion engine that oil flows out of the annular chamber to such an extent that the intake opening of the oil pump comes to be outside of the oil level.

In order to ensure that a sufficient amount of oil flows back into the annular chamber during running operation it is proposed that the cover is provided with at least one oil pass-through opening.

In order to still ensure a sufficient oil level into which the transmission immerses at least partly it is proposed that the at least one oil pass-through opening is provided with an upwardly projecting circumferential collar. The circumferential collar ensures that an oil puddle is formed on the cover with a depth corresponding to the height of the circumferential collar. It can be provided for the sake of simplicity that the cover comprises a central opening which is penetrated by the crankshaft.

In order to ensure a sufficient residual oil volume in the annular chamber for the mentioned case of the permissibility of a strong inclination merely in the direction of an overhead situated camshaft, it is proposed that at least one oil pass-through opening is arranged at the side of the crankshaft axis facing the at least one camshaft.

Cost-effective manufacturing capability is thus ensured in that the cover is formed by a cover plate.

A recess can be arranged beneath the camshaft for increasing the effective oil storage.

It can be provided for lowering the production expenditure that the con-rod is pressure die-cast and preferably comprises at least two die-cast parts divided in the region of the con-rod bearing, with the two die-cast parts being provided with a toothed configuration in the region of division. In accordance with an especially simple embodiment, the two die-cast parts can be joined with each other by self-cutting connecting rod bolts.

The use of the aforementioned internal combustion engine is especially preferable in a lawnmower, even though other types of application are possible.

BRIEF DESCRIPTION OF THE DRAWINGS

The invention is now explained in closer detail by reference to the enclosed drawings, wherein:

FIG. 5 shows a cylinder head of the internal combustion engine in accordance with the invention in an exploded view;

FIG. 6 shows the cylinder head in a side view according to the arrow VI in FIG. 5;

FIG. 7 shows the cylinder head in a side view according to arrow VII in FIG. 5;

DETAILED DESCRIPTION OF THE PREFERRED EMBODIMENT

Small, light, single-cylinder four-stroke internal combustion engines, as are used for driving lawnmowers and similar appliances for example, recently come with a valve control with an overhead camshaft (i.e. held in the cylinder head) which actuates the intake and exhaust valves.

Figure 1:
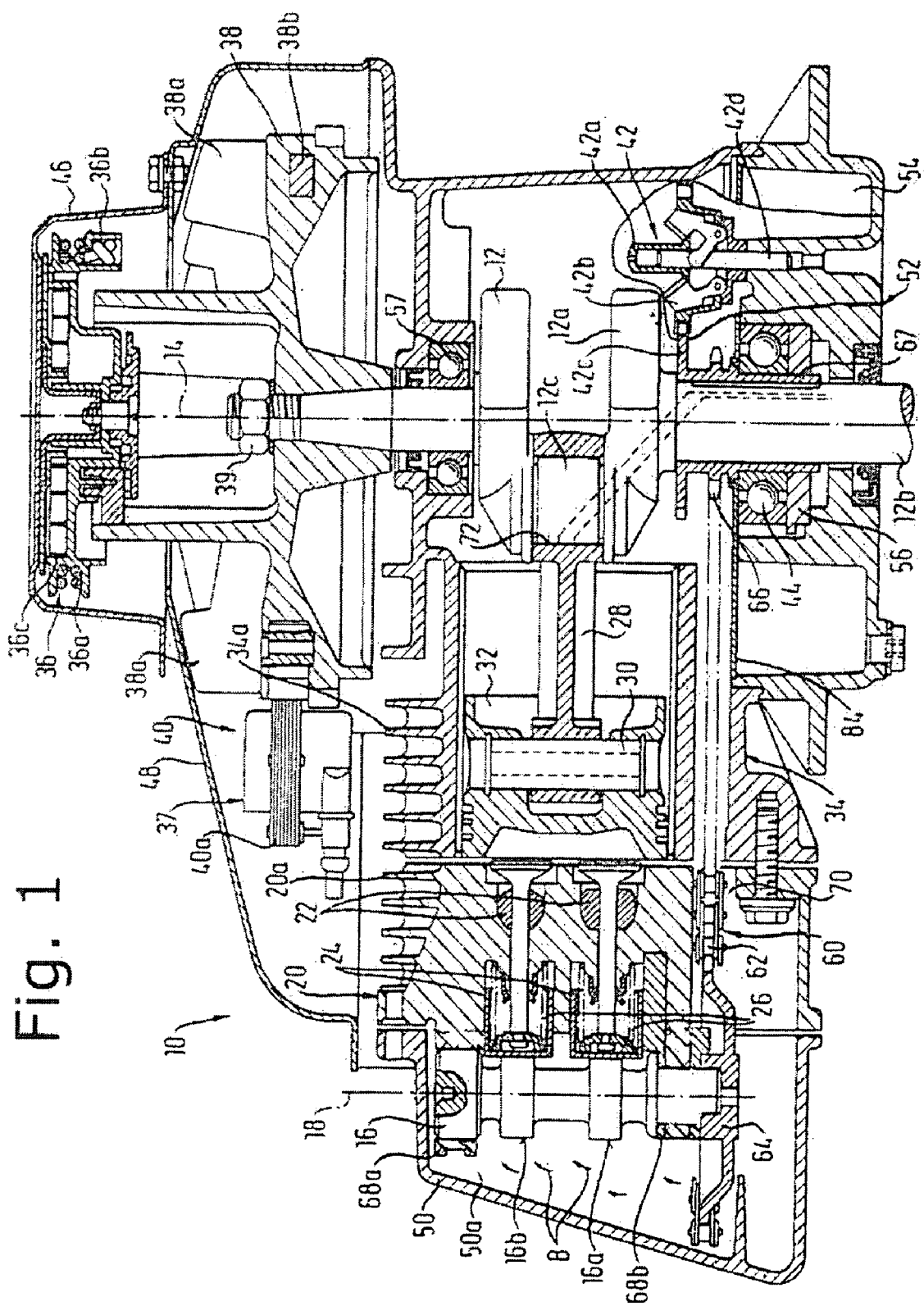
FIG. 1 shows a simplified vertical sectional view along the cylinder axis of an internal combustion engine configured in accordance with the invention.

Such a configuration is shown in the schematic diagram according to FIG. 1. The internal combustion engine designated with reference numeral 10 comprises a crankshaft 12 whose crankshaft axis 14 is vertically oriented in a normal position of the internal combustion engine. A camshaft 16 with an axis 18 parallel to the crankshaft axis 14 is rotatably held in a cylinder head 20 for directly actuating the overhead gas exchange valves 22, which in the illustrated example occurs via bucket tappets 24 which each enclose a valve spring 26.

In order to complement the general configuration of the internal combustion engine 10 it needs to be added that the crankshaft 12 is connected with a piston 32 via connecting rod 28 and a piston pin 30, which piston is held in a reciprocating fashion in the cylinder crankcase 34. The illustrated internal combustion engine 10 is air-cooled, for which respective cooling fins 34a and 20a are provided on the cylinder crankcase 34 and on the cylinder head 20. The oil lubrication system described below in closer detail can also be used in liquid-cooled internal combustion engines.

Further units of the internal combustion engine shown in FIG. 1 are a cable starter 36 as well as magneto device 37. The cable starter 36 has the usual configuration. It comprises a cable 36a which is wound up on a rope sheave 36b, with the inner cable end being fixed to said sheave. The outer cable end carries a handle (not shown). A rope winder spring 36c tensions the rope sheave 36b within the terms of keeping wound up the cable 36a. The rope sheave 36b is coupled to a magnet wheel 38 via a free-wheel (not shown), which magnet wheel is joined in a torsionally rigid manner (nut 39) to the upper end of the crankshaft 12.

The magnet wheel 38 is provided with cooling fins 38a. The magnet wheel 38 further carries at least one permanent magnet 38b as a part of the magnet starting device 37. During each passage of the permanent magnet 38b past the excitation unit 40 which is shown in FIG. 1 to the left of the magnet wheel 38, the required ignition voltage is generated in the same for the sparkplug (not shown). The core disks 40a can be seen which amplify the induction effect.

At the bottom right of FIG. 1, a conventional centrifugal governor 42 is shown which acts upon a throttle valve (not shown) for regulating the speed. A carrier part 42a for the centrifugal governor weights 42b is provided with a circumferential gearing. It engages in the gearwheel 42c which is attached in a torsionally rigid manner to a lower journal 12b of the crankshaft 12 between a lower crank web 12a of the crankshaft 12 and a lower crankshaft bearing 44. The centrifugal governor weights 42b are used for the axial adjustment of an actuating member 42d which is connected with the throttle valve by way of means not shown.

A cable starter 36 is covered towards the outside with a cap 46. A further cap 48 covers the magneto device 37 plus magnet wheel 38. A cylinder head cover 50 covers the camshaft 16.

The lower crankshaft bearing 44 plus centrifugal governor 42 are situated in a separate housing part 52 which is attached to the cylinder crankcase 34. The housing part 52 also houses an annular chamber 54 as a part of the oil lubricating system yet to be described, and—in one version of the internal combustion engine—an oil pump 56 in the form of a sliding vane pump. An upper crankshaft bearing 57 is directly inserted into the cylinder crankcase 34. The drive of the camshaft 16 which is synchronous with the crankshaft rotation is carried out via a transmission 60 which simultaneously assumes the function of the lubricating oil distribution in order to thus ensure a sufficient lubrication of the internal combustion engine 10. In the illustrated embodiment, the transmission 60 is formed by an endless chain 62 (roller chain or inverted-tooth chain) which runs both over a gearwheel 64 attached to the lower end of the camshaft 16 and over a gearwheel 66 which is attached in a torsionally rigid manner to a journal 12b of the crankshaft 12 (see top view according to FIG. 4). The chain 62 can be tensioned by a tensioning device (not shown) depending on the configuration of the internal combustion engine. It may also be omitted in the case of a simple design of the engine. The gearwheel 66 can form a common component with the said gearwheel 42c in the form of a gear sleeve 67 which is inserted on the journal 12b and is torsionally rigidly connected with the same. Instead of the chain it is also possible to use an endless belt, especially a toothed belt, which then runs over respective pulleys of the camshaft and the crankshaft.

In order to continually obtain a sufficient lubrication of the engine both in the case of a precisely vertical crankshaft axis 14 as well as in the inclined position, the transmission chamber 70 receiving the transmission 16 is simultaneously arranged within the internal combustion engine 10 as an oil storage chamber. The chain 62 (or the belt in the case of a belt drive) always immerses into the oil reserve both in the normal position with a precisely vertical crankshaft axis as well as in respective inclined positions, leading to the consequence that the chain 62 conveys the oil away from the oil reserve, i.e. to a region which momentarily does not comprise any stagnant oil.

Figure 2:
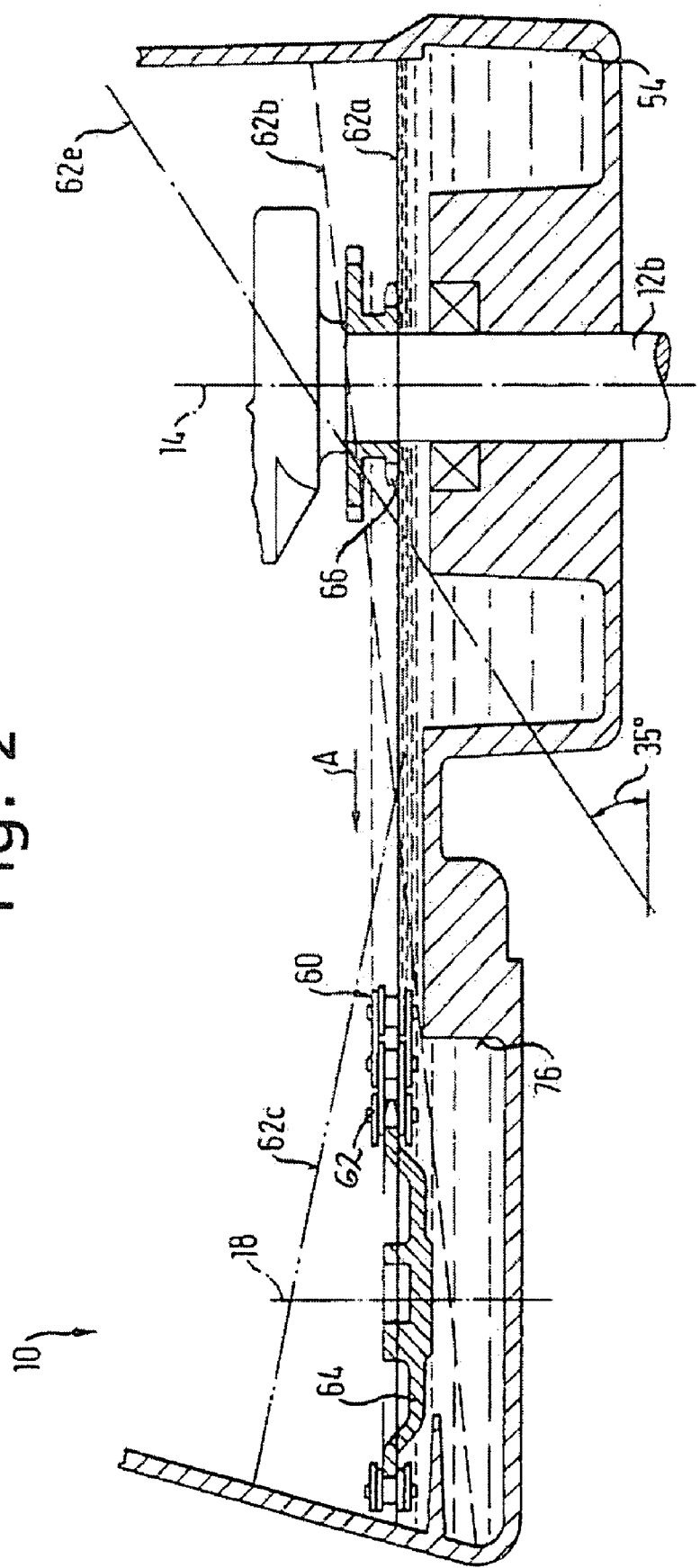
FIG. 2 shows a further simplified vertical sectional view of a version of the internal combustion engine according to FIG. 1 without the oil pump, with a number of oil levels being indicated at different inclinations of the engine.

FIG. 2 has been provided to illustrate this in closer detail. An oil level 62a can be seen with the unbroken line at a precisely vertical (perpendicular) orientation of the crankshaft axis 14. The level 62a is positioned in such a way that the chain 62 as well as gearwheels 64 and 66 immerse at least partly into the lubricating oil. If the internal combustion engine 10 is inclined in such a way that the lawnmower using the internal combustion engine 10 is moved uphill, one will obtain the oil level 62b at a low inclination for example insofar as the conventional design is used with cylinders of the internal combustion engine which face forwardly in the driving direction.

One can now see in FIG. 2 that now the rear gearwheel 66 which is situated at the right side in FIG. 2 is fully immersed in the lubricating oil. The chain 62 therefore conveys lubricating oil forwardly (arrow A) to the front gearwheel 64. The oil is ejected there radially to the outside with respect to axis 18 as a result of the centrifugal force obtained during the deflection of the chain 62 about the gearwheel 64. This produces oil splashes and oil mist. These splashes or the oil mist spread within the inner space 50a of the cylinder head cover 50 (arrows B in FIG. 1 and FIG. 4). As a result, both an upper as well as a lower pivot bearing point 68a and 68b of the camshaft 16 on the cylinder head 20 as well as the cam surfaces 16a and 16b of the camshaft 16 which rest on the bucket tappets 26 are sufficiently supplied with lubricating oil. The bucket tappets 26 per se are also provided, if required, with sufficient lubricating oil within their respective guide bore in the cylinder head 20.

Figure 4:
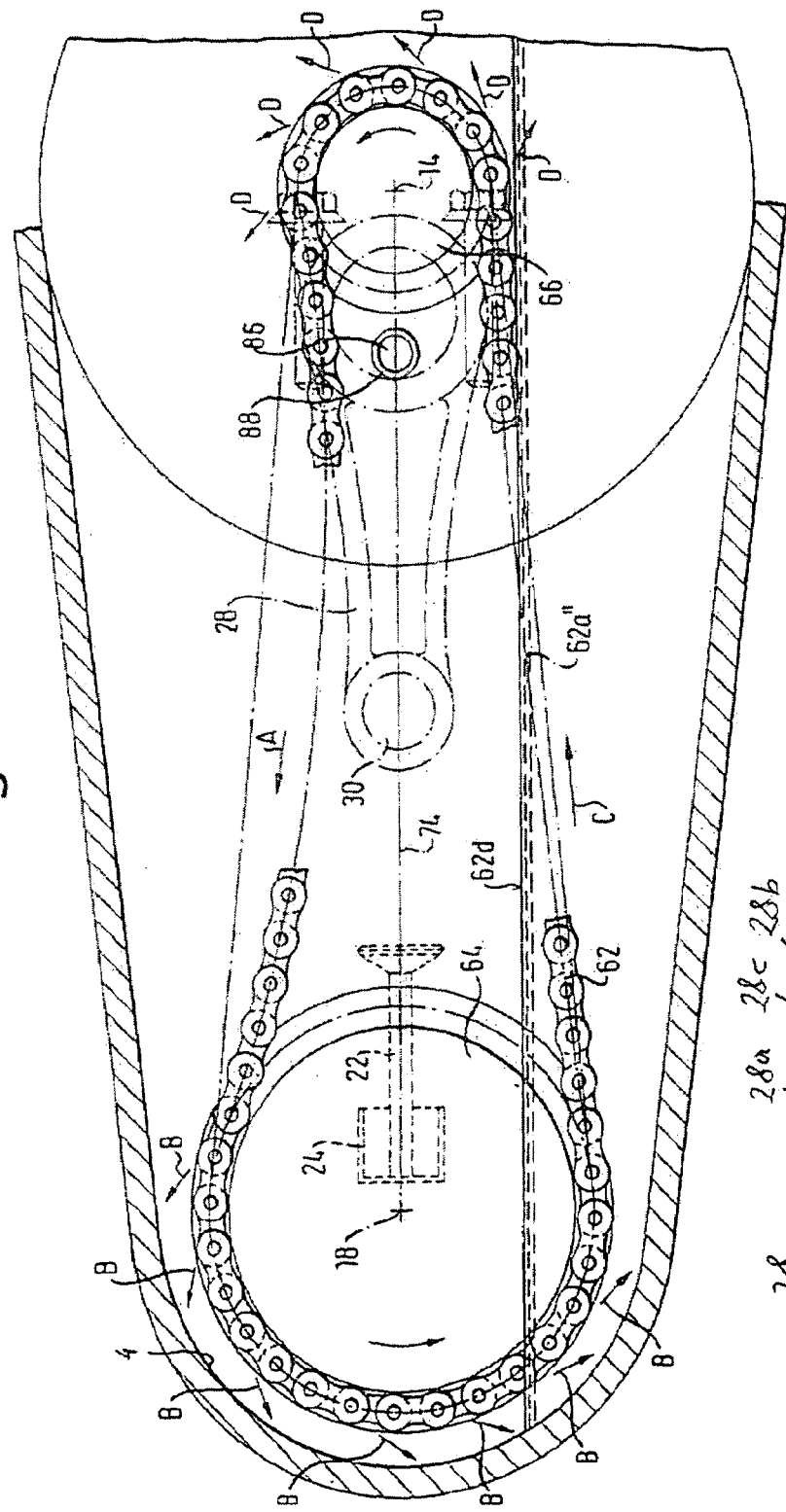
FIG. 4 shows a top view of the transmission of the internal combustion engine according to FIGS. 1 and 3 (line of intersection IV—IV in FIG. 1 and FIG. 3)
Figure 4A:
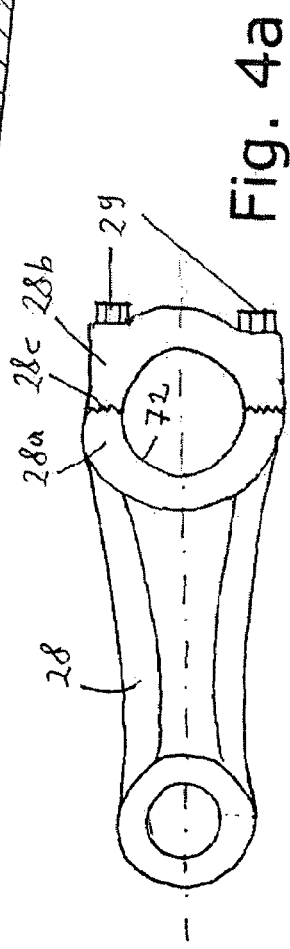
FIG. 4a shows a connecting rod in an embodiment.
Figure 9:
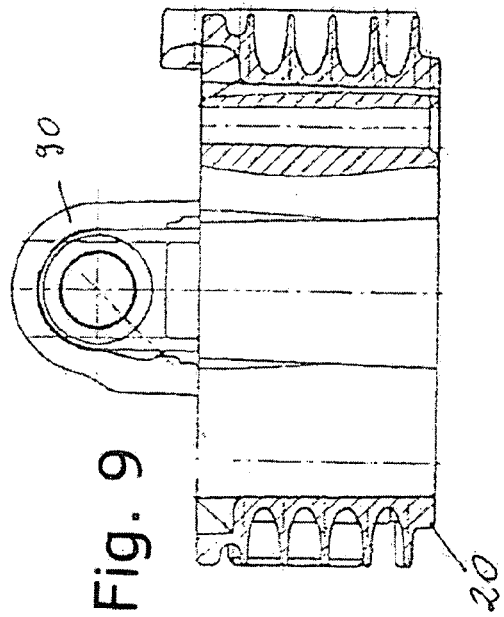
FIG. 9 shows the cylinder head in a sectional view along the line IX—IX in FIG. 8.
Figure 10:
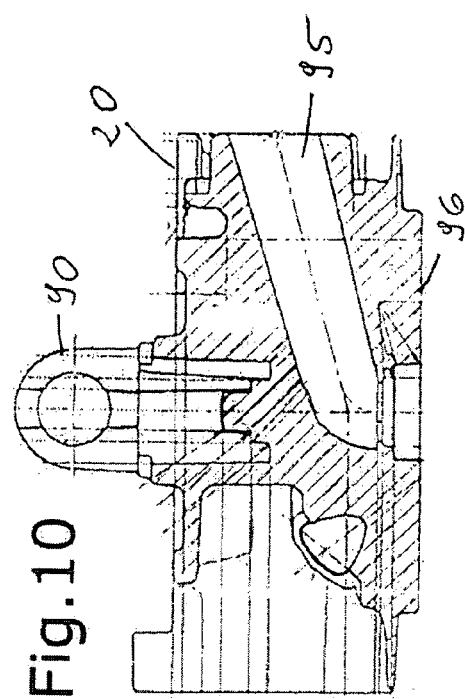
FIG. 10 shows the cylinder head in a sectional view along line X—X in FIG. 8.
Figure 8:
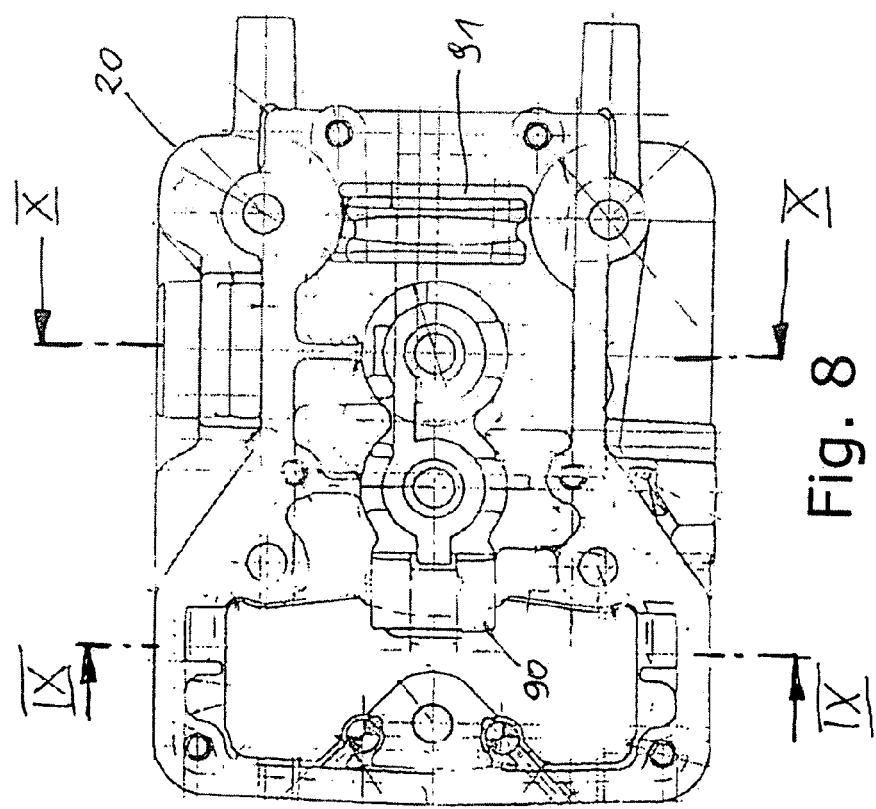
FIG. 8 shows the cylinder head in a top view.

If the internal combustion engine 10 is inclined in the opposite direction (moving the lawnmower downhill), an oil level 62c is obtained which is indicated in FIG. 2 with a dot-dash line. The front gearwheel 64 now immerses into the lubricating oil. The chain 62 therefore conveys lubricating oil into the crankshaft chamber with its strand 62a'' of the chain which runs back to the gearwheel 66 (arrow C in FIG. 4). The consequence is again that oil splashes are ejected radially outwardly in the region of the deflection of chain 62 about the gearwheel 66 (arrows D in FIG. 4). The obtained oil splashes and the obtained oil mist ensure a lubrication both of the crankshaft bearings 44 and 57, as well as generally of a con-rod bearing 72 between connecting rod 28 and journal 12c of the crankshaft 12. The connecting rod 28 can be die-cast and comprise two die-cast parts 28a, 28b which are mutually geared in the area of their division 28c in the region of the con-rod bearing 72 (FIG. 4a). In an especially simple way, the two die-cast parts 28a, 28b can be joined with each other by self-cutting con-rod bolts.

The oil conveying effect of the transmission 60 which ensures the lubrication from the momentary lubricating oil puddle to regions which are remote from the puddle is even given when the internal combustion engine 10 assumes a lateral inclination, i.e. an inclination about a horizontal pivoting axis 74 which lies in a plane containing the two axes 14 or 18. An oil level 62d is indicated in FIG. 4 which would be obtained in the case of a respective lateral inclination of the internal combustion engine 10 (with a view in the direction parallel to the axes 14 and 16). One can see that at least the front gearwheel 64 immerses into the oil, so that a conveying effect in the direction C is obtained, with oil splashes ejected in the direction of arrow D and B during the circulation of the chain 62 about the rear gearwheel 66 and the front gearwheel 64. The oil splashes and the oil mist ensure sufficient lubrication of all bearing points.

A certain oil storage is necessary to ensure that the transmission 60 always runs partly through the stagnant lubricating oil even in the so-called oblique positions. In order to receive the same, the already mentioned annular chamber 54 is provided which encloses the journal 12b. In addition, a recess 76 for forming a respective oil pocket for storage oil can be provided in the region of the front gearwheel 64. The respectively large oil storage ensures even in the case of extreme inclinations that the transmission 60 always partly immerses into the oil storage. FIG. 2 shows an oil level 62e indicated with a dot-dash line, which level is assumed when the internal combustion engine 10 assumes the critical inclination of 35° (when the lawnmower travels uphill) The rear gearwheel 66 continues to remain immersed in the oil storage. The critical angle for moving the lawnmower downhill may under certain circumstances be lower because moving a lawnmower downhill at strong inclinations is not permitted for safety reasons (accident hazard for the operator).

The continual, at least partly immersion of the transmission into the oil storage also leads to the advantage of a reduction of the running noise.

The oil storage is dimensioned in such a way that in the case of an inclination of the internal combustion engine 10 about the mentioned horizontal axis 74 even by more than 90°, the oil level 62d will remain below the gas exchange valves 22 and the bucket tappets 24, so that any penetration of hot and fluid oil via the valve guides and the intake valve into the combustion chamber or into the exhaust port and the sound absorber is avoided right from the start. Such a lateral inclination of the engine is necessary when the knife space needs to be cleaned after using the lawnmower or when it is necessary to carry out maintenance or repair work on the cutting tool (rotary mowing blades).

Figure 3:
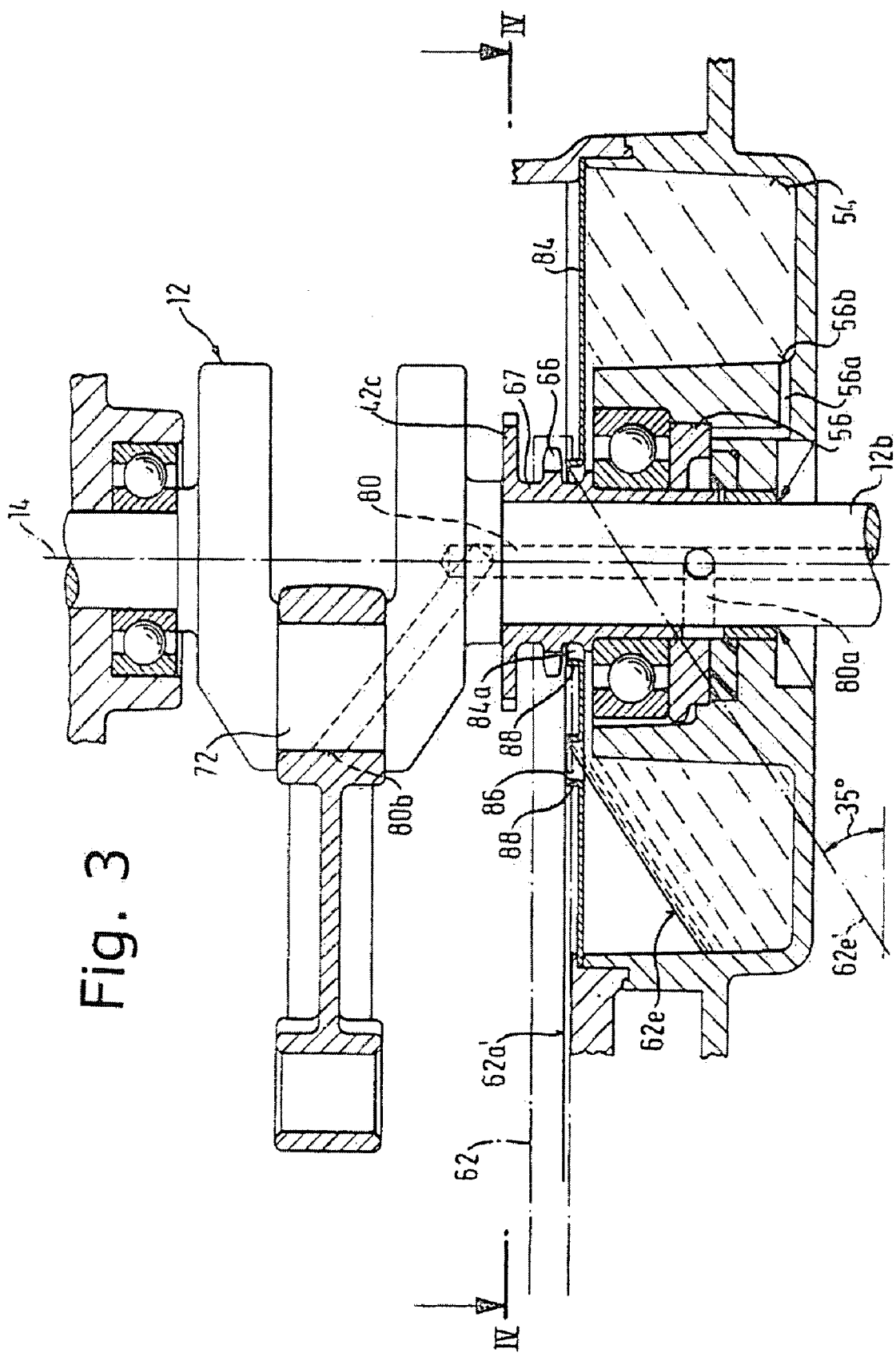
FIG. 3 shows a vertical sectional view in the region of the crankshaft of the internal combustion engine according to FIG. 1 with an oil pump.

The already mentioned oil pump 56 can be used for highly stressed engines. As is shown in FIG. 3, the pump 56 receives oil via a feed duct 56a from the annular chamber 54. Since the internal combustion engine 10 is to be suitable especially for extreme inclinations to the rear (swivelling of the engine about a horizontal axis in the clockwise sense of FIG. 1 and FIG. 3), the orifice 56b of the duct 56a is situated at the side of the crankshaft axis 14 which is diametrically opposite of the camshaft axis 16.

The oil pump 56 is connected to a pass-through duct 80 of the crankshaft 12 via a radial stub duct 80a. The pass-through duct 80 ends at the con-rod bearing 72 by forming an outlet 80b. The bearing which is stressed most strongly during the operation, namely the con-rod bearing 72, is therefore positively lubricated. The lubrication of the other bearings occurs further by using the conveying effect of transmission 60.

In order to reliably ensure in the possible inclination positions of the internal combustion engine 10 that the positive lubrication of the con-rod bearing is maintained via the oil pump 56, the annual chamber 54 is provided with a cover 84 in the embodiment with oil pump. In order to maintain the oil circulation running via the oil pump 56, the cover 84 does not completely seal the annular chamber 54, but comprises oil pass-through openings which are adjusted to the oil conveying capacity of the oil pump 56. In many cases it is already sufficient to provide a central opening 84a of the cover 84 which is penetrated by the crankshaft 12 with a respectively larger dimensioning in order to ensure a clearance between cover 84 and crankshaft 12 (or sleeve 67 with the gearwheels 42c and 66).

Further openings may be required under certain circumstances. Such an oil pass-through opening 86 is indicated in FIGS. 3 and 4. It lies on the side of the crankshaft axis 14 facing the camshaft 16. The reason for the same is again that in the strong inclined position which must be considered primarily with an upwardly inclined cylinder (critical angle 35°, see FIG. 3) the orifice 56b of the feed conduit 56a lies in any case beneath the oil level. This oil level sets itself at least initially to the level 62e according to FIGS. 2 and 3. In the case of a oil storage quantity which is smaller in comparison with FIG. 2, a level 62e' as indicated in FIG. 3 will be obtained with an oil storage quantity which is lower in comparison with FIG. 2, which level 62e' is defined by the lowermost position of the central opening 84a. In any case, the opening 56b of the feed conduit 56a always remains in the lubricating oil bath.

In order to ensure a minimum level of the oil level when using the cover 84 (oil level 62a' at a vertical crankshaft axis 14), the oil pass-through openings (central opening 84a and opening 86) can each be provided with an upwardly projecting circumferential collar 88 which is used as a kind of "overflow". Depending on the inclination of the internal combustion engine 10, the chain 62 always conveys oil from the oil puddle respectively formed on the cover to the regions of the internal combustion engine 10 which are remoter from said puddle. No further movable parts are required for this kind of lubrication, so that a reliable operation is ensured at a cost-effective configuration.

In order to enable a rigid mounting of the camshaft 16 on the one hand and a rapid mounting of the camshaft 16 in the cylinder head 20 on the other hand, the camshaft bearings 90, 91 are provided as tunnel bearings, so that the camshaft 16 can be introduced in the axial direction into the camshaft bearings 90, 91 during mounting. Bearing brackets and bearing screws can thus be omitted. In order to provide the bearing block 92 for the camshaft bearing 91 with the most compact possible configuration, the bearing bore 93 for the camshaft bearing 91 is provided with a recess 94 in a region of the bearing surface which is less stressed. The recess 94 is arranged according to the profile shape of the cams 17, so that the cams 17 can be threaded through the recess 94 during the insertion of the camshaft 16 into the camshaft bearings 90, 91. The recess 94 must be provided with a slightly larger configuration than the cams 17. The timing gear 64 is used for axially securing the camshaft 16.

The cylinder head 20 advantageously consists of an aluminium alloy, with the gas exchange ports 95 being provided with a straight configuration, so that the same can be produced by pressure diecasting by drawing by means of steel ingot moulds. A plane cylinder head floor 96 promotes this production process.

The aforementioned small, light, single-cylinder four-stroke internal combustion engine 10 is suitable for driving appliances, especially a lawnmower. Other types of use with alternating inclination of the internal combustion engine can be considered.

The invention claimed is:

1. A four-stroke internal combustion engine comprising at least one cylinder for a reciprocating piston which acts via a connecting rod on a crankshaft and at least one overhead camshaft for driving overhead gas exchange valves and a transmission between crankshaft and camshaft with a motion plane within a transmission chamber which is perpendicular to a crankshaft axis, wherein at least one camshaft bearing for bearing the camshaft is configured as a tunnel bearing, with a bore of a bearing block of at least one camshaft bearing comprising substantially at least one recess corresponding to a shape of a cam, wherein the recess is arranged in a minimally stressed bearing region of the bearing bore, and wherein a timing gear for driving the camshaft is arranged at an end of the camshaft which is averted from the bearing block with the recess and is fixedly joined thereto, with the timing gear simultaneously securing the axial position of the camshaft.

2. The internal combustion engine according to claim 1, wherein at least one camshaft bearing is arranged in an integral manner with the cylinder head.

3. The internal combustion engine according to claim 1, wherein the timing gear is arranged as a timing chain wheel.

4. The internal combustion engine according to claim 1, wherein a cylinder head comprises a plane cylinder head floor.

5. The internal combustion engine according to claim 1, wherein the crankshaft is held by means of roller bearings.

6. The internal combustion engine according to claim 1, wherein the cylinder head joined to a cylinder crankcase comprises diecastable gas exchange ports.

7. The internal combustion engine according to claim 6, wherein the cylinder head consists of an aluminum alloy.

8. The internal combustion engine according to claim 1, wherein the transmission chamber is configured as an oil storage chamber, such that the respectively lowest situated section of the transmission is immersed in the oil level in the normal position and optionally in oblique positions of the engine.

9. The internal combustion engine according to claim 1, wherein the transmission is formed by an endless chain which runs via a gearwheel joined to the camshaft and a gearwheel joined to the crankshaft.

10. The internal combustion engine according to claim 1, wherein the transmission is formed by an endless belt, which runs via a pulley joined to the camshaft and a pulley joined to the crankshaft.

11. The internal combustion engine according to claim 1, wherein in the region of the end on the crankshaft side and/or the end on the camshaft side of the transmission at least one deflector surface is provided for oil ejected from the transmission for producing splash oil or an oil mist.

12. The internal combustion engine according to claim 11, wherein in a region of a bearing point of the crankshaft or the camshaft at least one oil groove is provided for conducting precipitated oil mist or splash oil to the respective bearing point.

13. The internal combustion engine according to claim 1, characterized by an oil pump whose inlet is connected to an oil storage chamber and whose outlet is connected with a crankshaft con-rod bearing.

14. The internal combustion engine according to claim 13, wherein the outlet of the oil pump is connected to a through conduit of the crankshaft with an outlet on a con-rod bearing.

15. The internal combustion engine according to claim 13, wherein the oil pump is a rubber sliding vane pump driven by the crankshaft.

16. The internal combustion engine according to claim 13, wherein a part of the oil storage chamber is an annular chamber enclosing the crankshaft.

17. The internal combustion engine according to claim 13, wherein the inlet of the oil pump is connected with the annular chamber via a feed conduit which opens into the annular chamber in the region of a floor of the annular chamber.

18. The internal combustion engine according claim 17, wherein the feed conduit opens into the annular chamber on the side of the crankshaft axis which is diametrically opposite of the camshaft.

19. The internal combustion engine according to claim 16, wherein the annular chamber is provided with a cover arranged beneath the transmission.

20. The internal combustion engine according to claim 19, wherein the cover is provided with at least one oil pass-through opening.

21. The internal combustion engine according to claim 20, wherein the at least one oil pass-through opening is provided with an upwardly projecting circumferential collar.

22. The internal combustion engine according to claim 20, wherein the cover comprises a central opening which is penetrated by the crankshaft.

23. The internal combustion engine according to 20, characterized by at least one oil pass-through opening on a side of the crankshaft axis facing the at least one camshaft.

24. The internal combustion engine according to claim 19, wherein the cover is formed by a cover plate.

25. The internal combustion engine according to claim 1, wherein a recess beneath the camshaft is a part of the oil storage chamber.

26. The internal combustion engine according to claim 1, wherein the connecting rod is die-cast and comprises at least two die-cast parts which are divided in the region of the con-rod bearing.

27. The internal combustion engine according to claim 26, wherein the two die-cast parts are provided with a toothed configuration in the region of division.

28. The internal combustion engine according to claim 26, wherein the two die-cast parts are joined with each other by self-cutting connecting rod bolts.

29. A lawnmower which includes an internal combustion engine according to claim 1.

* * * * *